United States Patent
Na et al.

(10) Patent No.: US 11,226,900 B2
(45) Date of Patent: Jan. 18, 2022

(54) USING A BLOOM FILTER TO REDUCE THE NUMBER OF MEMORY ADDRESSEES TRACKED BY A COHERENCE DIRECTORY

(71) Applicant: Advanced Micro Devices, Inc., Santa Clara, CA (US)

(72) Inventors: Weon Taek Na, Bellevue, WA (US); Yasuko Eckert, Bellevue, WA (US); Mark H. Oskin, Bellevue, WA (US); Gabriel H. Loh, Bellevue, WA (US); William Louie Walker, Bellevue, WA (US); Michael Warren Boyer, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 58 days.

(21) Appl. No.: 16/776,416

(22) Filed: Jan. 29, 2020

(65) Prior Publication Data
US 2021/0232501 A1 Jul. 29, 2021

(51) Int. Cl.
*G06F 12/0815* (2016.01)
*G06F 16/22* (2019.01)
*G06F 12/0831* (2016.01)

(52) U.S. Cl.
CPC ...... *G06F 12/0815* (2013.01); *G06F 12/0831* (2013.01); *G06F 16/2272* (2019.01); *G06F 2212/1032* (2013.01)

(58) Field of Classification Search
None
See application file for complete search history.

(56) References Cited

U.S. PATENT DOCUMENTS

| 2008/0209133 A1* | 8/2008 | Ozer | G06F 12/0831 711/146 |
| 2014/0095806 A1* | 4/2014 | Fajardo | G06F 12/0831 711/146 |
| 2014/0281180 A1* | 9/2014 | Tune | G06F 12/0864 711/104 |
| 2016/0350220 A1* | 12/2016 | Salisbury | G06F 12/0817 |

OTHER PUBLICATIONS

Menezo et al. (Flash Coherence: A Morphable Hybrid Coherence Protocol to Balance Energy, Performance and Scalability; IEEE 2015, pp. 198-209) (Year: 2015).*

* cited by examiner

*Primary Examiner* — Kaushikkumar M Patel
(74) *Attorney, Agent, or Firm* — Hickman Becker Bingham Ledesma LLP; Edward A. Becker

(57) ABSTRACT

An approach for tracking data stored in caches uses a Bloom filter to reduce the number of addresses that need to be tracked by a coherence directory. When a requested address is determined to not be currently tracked by either the coherence directory or the Bloom filter, tracking of the address is initiated in the Bloom filter, but not in the coherence directory. Initiating tracking of the address in the Bloom filter includes setting hash bits in the Bloom filter so that subsequent requests for the address will "hit" the Bloom filter. When a requested address is determined to be tracked by the coherence directory, the Bloom filter is not used to track the address.

18 Claims, 3 Drawing Sheets

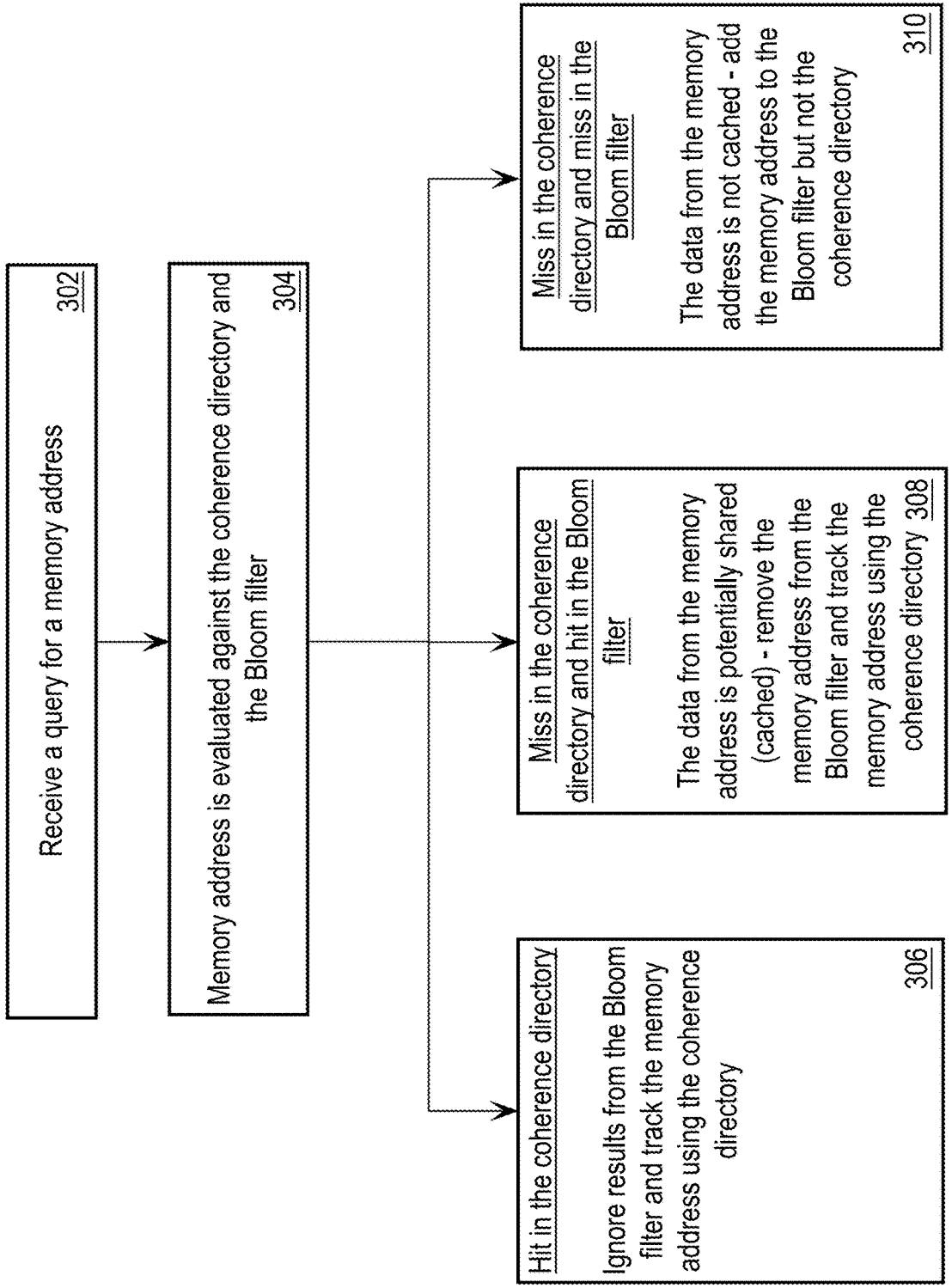

USING A BLOOM FILTER TO REDUCE THE NUMBER OF MEMORY ADDRESSEES TRACKED BY A COHERENCE DIRECTORY

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Many multi-processor computing architectures use a directory-based coherence mechanism to ensure cache coherency. A coherence directory is used to tracks copies of data across multiple caches, where each entry in the coherence directory includes one bit per processor per cache line or one or more processor IDs per cache line to indicate whether the data is cached.

One of the problems with directory-based coherence mechanisms is that the size of the coherence directory increases as the number and size of caches increase, leading to excessive size requirements for coherence directories. In addition, it has been observed that most cached data are not actively shared, i.e., stored in more than one cache, and therefore do not require coherence tracking.

One of the solutions for addressing this problem is to track multiple cache lines per coherence directory entry to reduce the number of entries in coherence directories, at the expense of reduced accuracy. While this helps to mitigate the area scalability problem of coherence directories, the size of coherence directories must still grow as the number and size of caches increase. Furthermore, virtual addressing and the common use of 4KB Operating System (OS) pages can limit the effectiveness of this solution, potentially limiting the scalability of this approach in future generation architectures.

Another solution uses a Tagless Coherency (TL) directory to improve the area scalability of coherence directories. The TL solution uses hashing to track all cached addresses by performing a lossy compression of cached line tags and adding the compressed tags into hash buckets. The TL solution, however, is built on top of duplicate tag directories and cannot be easily applied to more widely used sparse directory structures. This is because unlike duplicate tag directory entries, sparse directory entries also have additional directory states that cannot be decoupled from the tags, such as owner-IDs and sharer bit vectors. Thus, there is a need for a better approach for controlling the size of coherence directories as computing architectures increase the number and size of caches.

BRIEF DESCRIPTION OF THE DRAWINGS

Embodiments are depicted by way of example, and not by way of limitation, in the figures of the accompanying drawings and in which like reference numerals refer to similar elements.

FIG. 3 is a flow diagram that depicts an approach for tracking data stored in caches using a coherence directory and a Bloom filter.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Architecture
III. Tracking Data Stored in Caches Using a Bloom Filter I. Overview An approach for tracking data stored in caches uses a Bloom filter to reduce the number of addresses that need to be tracked by a coherence directory. When a requested address is determined to not be currently tracked by either the coherence directory or the Bloom filter, tracking of the address is initiated in the Bloom filter, but not in the coherence directory. Initiating tracking of the address in the Bloom filter includes setting hash bits in the Bloom filter so that subsequent requests for the address will "hit" the Bloom filter. When a requested address is determined to be tracked by the coherence directory, the Bloom filter is not used to track the address.

The use of a Bloom filter in combination with a coherence directory as described herein provides a technical solution to the scalability problem of using coherency directories to track data stored in caches. The technical solution reduces the number of addresses tracked by coherence directories by tracking private data in the Bloom filter instead of the coherence directory. As used herein, the term "private data" refers to data that is stored in only a single cache. This greatly reduces the amount of data tracked by coherency directories in implementations where a large number of memory addresses that are cached are cached in only a single cache.

II. Architecture

Figure 1:
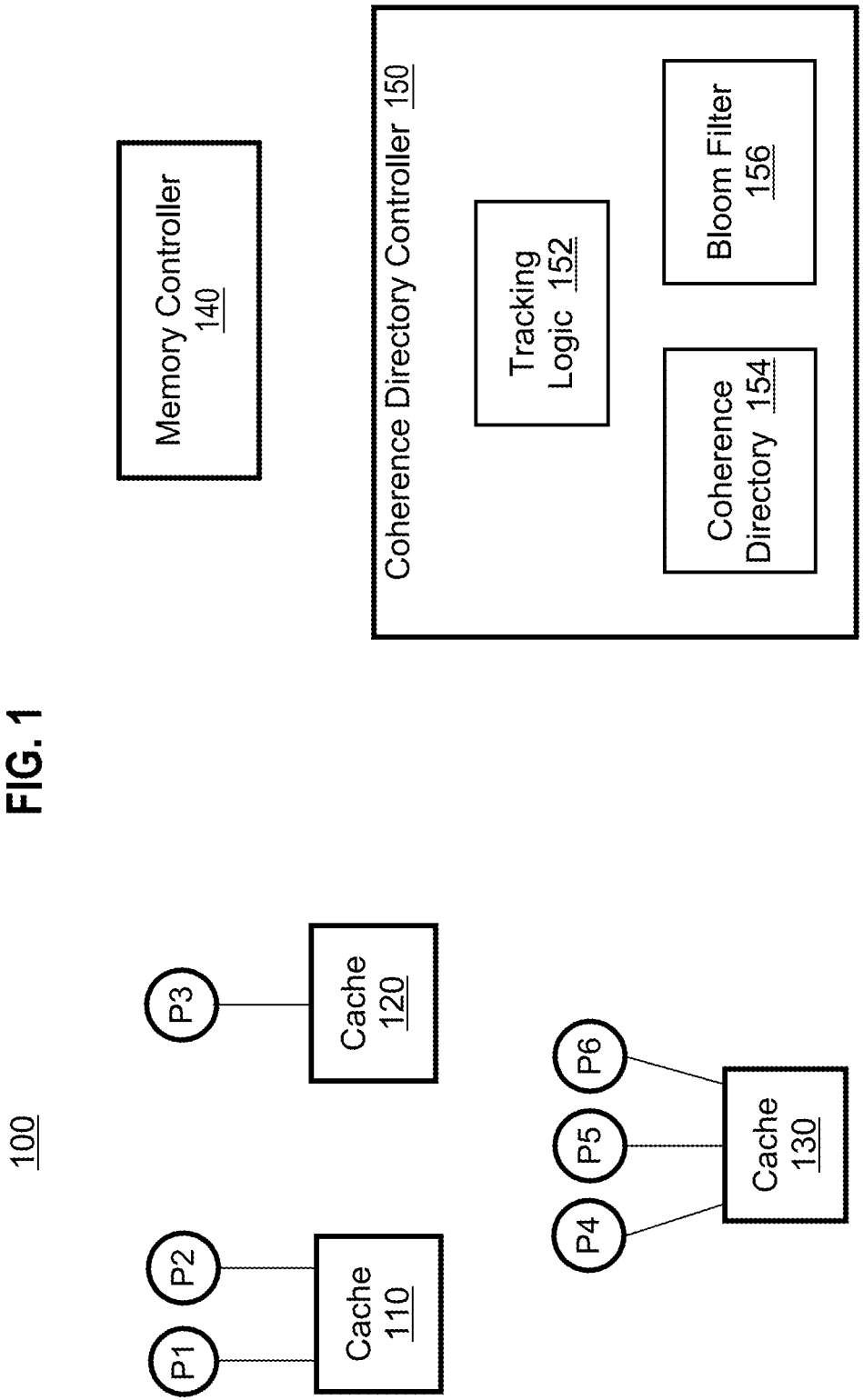
FIG. 1 is a block diagram that depicts an arrangement for tracking data stored in caches.

FIG. 1 is a block diagram that depicts an arrangement 100 for tracking data stored in caches. Arrangement 100 includes microprocessors P1-P6, corresponding caches 110, 120, 130, a memory controller 140, and a coherence directory controller 150. Embodiments are described herein in the context of microprocessors but are not limited to the microprocessor context and are applicable to any type of computational unit that has a cache. Microprocessors P1-P6 are any type of microprocessor and according to an embodiment, microprocessors P1, P2 are co-located on a die and share the cache 110, e.g., in a chiplet arrangement. Similarly, microprocessors P4-P6 are co-located on a die and share the cache 130, also in a chiplet arrangement. Embodiments are not limited to chiplet implementations. Caches 110, 120, 130 are implemented by any type of cache including, for example, a last level cache.

The memory controller 140 controls the reading and writing of data to a main memory (not depicted). The coherence directory controller 150 includes tracking logic 152 that implements a coherency mechanism to maintain the coherency of data stored in caches 110, 120, 130 using a coherence directory 154 and a Bloom filter 156. The coherence directory 154 and the Bloom filter 156 are not required to be implemented as part of the coherence directory controller 150 and in some embodiments are implemented separate from the coherence directory controller 150. The tracking logic 152 is implemented as part of coherency directory logic or as separate logic. The coherency directory 154 includes entries that specify whether data from an address space, e.g., a main memory address space, are stored in caches 110, 120, 130, the location(s) of the data, and a state of the data, e.g., an unmodified copy of the data, a modified copy of the data, etc.

Figure 2:
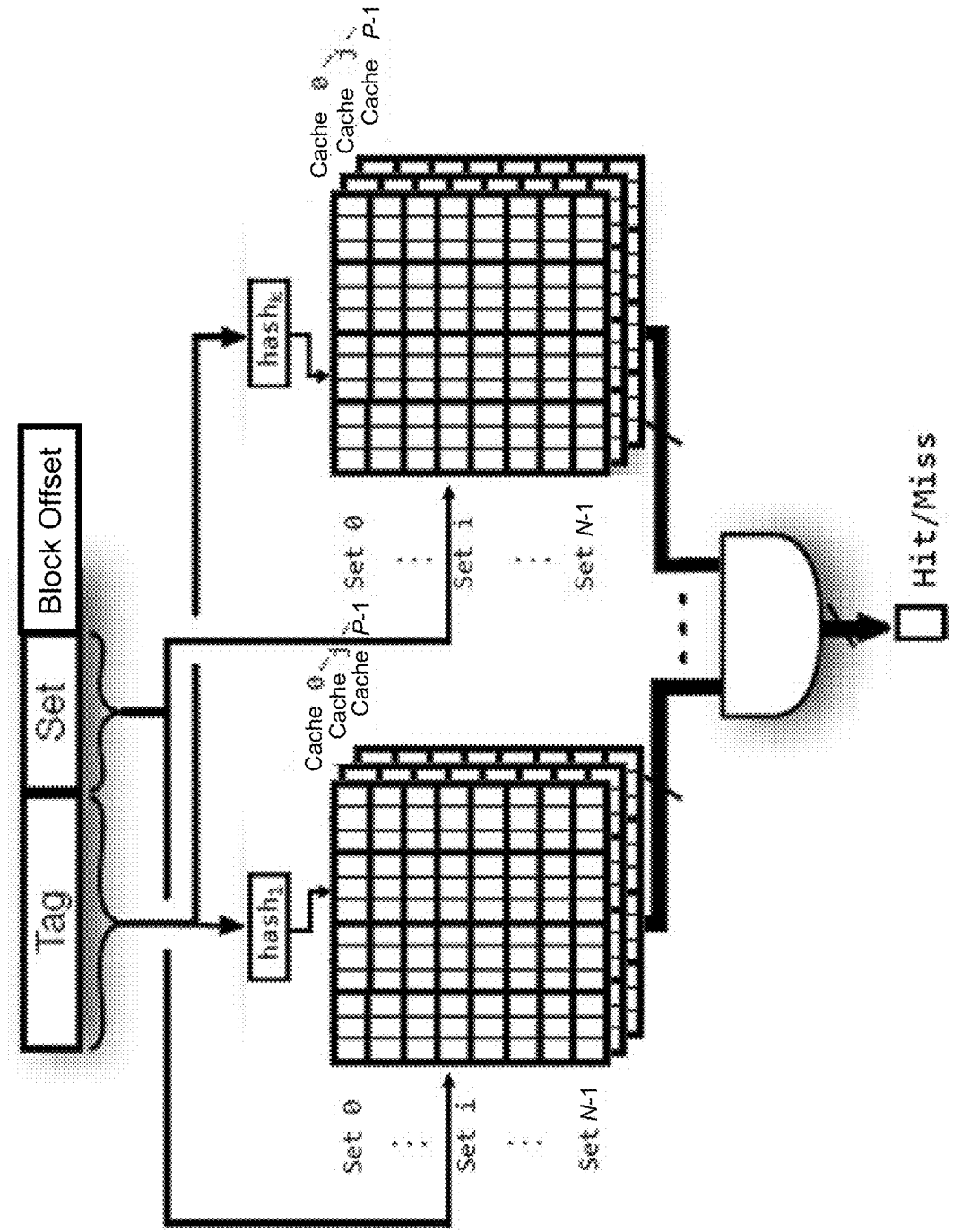
FIG. 2 is a block diagram that depicts a Bloom filter.

The Bloom filter 156 tracks whether data from the address space are stored in any of the caches 110, 120, 130. FIG. 2 is a block diagram that depicts a Bloom filter 200 according to an embodiment. The Bloom filter 200 is stored in memory, such as Static Random Access Memory (SRAM), and includes k sets of hash tables for k hash functions. Each set of hash tables, from the k sets of hash tables, includes a hash table for each of p caches. Assuming there are three caches, as depicted in FIG. 1, then each of the k sets of hash tables includes one hash table for each of the three caches. Each row of each hash table corresponds to one of N sets of data in the corresponding cache and includes a bit array for the corresponding hash function. The remaining portion of the address, such as a block offset, is not used.

As described in more detail hereinafter, the tag portion of an address is hashed into a single bit by each of the hash functions, and the bit can be searched, set, or cleared, given the set portion of the address. The number of hash functions and the size of the bit arrays used varies depending upon a particular implementation. Increasing the number of hash functions and the size of the bit arrays increases accuracy by reducing false positives, at the expense of additional storage space and increased computational costs. Using hash functions that are independent and uniformly distributed improves performance. Embodiments are not limited to the example implementation of the Bloom filter 156 depicted in FIG. 2. For example, to reduce the area of the Bloom filter 156, some or all of the k sets of hash tables for different caches are combined to share the same bit array.

III. Tracking Data Stored in Caches Using a Bloom Filter

FIG. 3 is a flow diagram 300 that depicts an approach for tracking data stored in caches using a coherence directory and a Bloom filter. In step 302, a query for a memory address is received by the coherency directory controller 150. For example, in response to a cache miss in cache 130, processor P5 generates and transmits, to the coherency directory controller 150, a request for data at a specified memory address.

In step 304, the memory address is evaluated against the coherence directory and the Bloom filter, either serially or in parallel. The tracking logic 152 determines whether the memory address is being tracked by the coherence directory 154 and the Bloom filter 156. If the coherence directory 154 contains an entry for the memory address, then the memory address is being tracked by the coherence directory 154 and represents a "hit" in the coherence directory 154.

To determine whether the memory address is being tracked by the Bloom filter 156, the tag portion of the memory address is hashed to one bit by each of the hash functions. Then a determination is made whether the resulting bits are set in the bit array for the corresponding set in each of the hash tables for each cache. As depicted in FIG. 2, the determination is made for a particular cache by performing a logical AND of the selected bits across the bit arrays for the corresponding set. If any of the bits are not set, then the logical AND will produce a zero result, guaranteeing that the memory address is not cached in that particular cache, representing a "miss" in the Bloom filter 156 for that particular cache. If all of the bits for the particular cache are set, then the logical AND will produce a one result, indicating that the memory address is possibly cached in that particular cache, which is considered to be a "hit" in the Bloom filter 156, for that particular cache. This process is repeated for each of the caches and then a logical OR is performed across the results of the caches. A result of zero guarantees that the memory address is not cached in any of the caches, while a result of one indicates that the memory address may be stored in one of the caches. A "hit" occurs when the memory address, or other memory addresses, were previously cached and are being tracked by the Bloom filter 156. Because the Bloom filter 156 cannot guarantee that a hit means the particular memory address is being tracked by the Bloom filter 156 instead of other memory addresses (a false positive), a hit in the Bloom filter 156 is acted on conservatively, as described in more detail hereinafter.

Given the possibility of a hit or miss in the coherency directory 154 and the Bloom filter 156, there are four possible outcomes: a hit in the coherency directory 154 and a hit in the Bloom filter 156, a hit in the coherency directory 154 and a miss in the Bloom filter 156, a miss in the coherency directory 154 and a hit in the Bloom filter 156, and a miss in the coherency directory 154 and a miss in the Bloom filter 156.

If the check of the memory address results in a hit in the coherency directory 154, indicating that the data from the memory address is currently cached in at least one cache and is being tracked in the coherency directory 154, then in step 306 the results of the Bloom filter 156 check are ignored and the memory address continues to be tracked in the coherency directory 154.

If the check of the memory address results in a miss in the coherence directory 154 and a hit in the Bloom filter 156, then the data from the memory address is potentially shared, i.e., cached in one or more of the caches, and being tracked by the Bloom filter 156. Due to the indeterminant nature of the Bloom filter 156, a hit in the Bloom filter 156 does not guarantee that the data from the memory address has been cached, because one or more of the bits in the hash tables may have been set by the hashing of one or more other memory addresses. Therefore, in response to a miss in the coherence directory 154 and a hit in the Bloom filter 156, in step 308 the memory address is removed from the Bloom filter 156, i.e., no longer tracked, and tracking of the memory address by the coherency directory 154 is initiated. For both read and write permission requests, a message is sent to the original owner of the cache line and the response with the memory address is sent to the coherency directory controller 150 to initiate tracking of the memory address in the coherence directory 154.

To remove the memory address from the Bloom filter 156, bits in the Bloom filter 156 are cleared to avoid false positives in the same manner as removing a memory address from the Bloom filter 156 after a cache line eviction. Clearing the bits for a memory address that is no longer to be tracked by the Bloom filter 156 risks clearing bits that are needed to track other memory addresses in the Bloom filter 156, which might inadvertently stop tracking of one or more of those other memory addresses.

This problem is addressed by the tracking logic 152 scrubbing the Bloom filter 156 by resetting bits in the Bloom filter 156 that are known to not be needed to track the valid memory addresses. This includes rehashing all of the memory addresses within the corresponding set being tracked by the Bloom filter 156 to create a result set of bits that need to remain set in the Bloom filter 156, and then only resetting bits not in the result set. The memory addresses being tracked by the Bloom filter 156 are maintained by the coherence directory controller 150 or alternatively, are retrieved from the caches 110, 120, 130. This includes the coherency directory controller 150 contacting the caches 110, 120, 130 to identify memory addresses that should be maintained by the Bloom filter 156. According to an embodiment, only the caches with a hit in the Bloom filter 156 for the memory address being removed are contacted. In situations where the caches 110, 120, 130 are non-inclusive, meaning that memory addresses are possibly cached in higher level caches but not in the caches 110, 120, 130, the coherency directory controller 150, or the cache controllers for the caches 110, 120, 130, contact the higher level caches to identify memory addresses that are cached by the higher level caches and therefore need to continue to be tracked by the Bloom filter 156. One example approach is for the cache controllers for the caches 110, 120, 130 to transmit a control message to an upper level cache where an acknowledgement message confirms that that a memory address is cached by the upper level cache. Alternatively, the controllers for the upper level caches return a memory address.

This approach preserves the memory addresses currently being tracked by the Bloom filter 156 while resetting other bits to reduce false positives and is performed for each cache eviction request. Alternatively, the approach is performed less frequently based upon other criteria to reduce the overhead of processing all of the tracked memory addresses using the hash functions for each eviction request or coherency direction miss/Bloom filter hit. Examples of the other criteria include, without limitation, after a specified amount of time, after a specified number of clock cycles, after a specified number of accesses, etc.

If the check of the memory address results in a miss in both the coherence directory 154 and the Bloom filter 156, then the data from the memory address is not currently cached in any of the caches 110, 120, 130. In step 310, the memory address is added to the Bloom filter 156 but not the coherency directory 154. This means that an entry for the memory address does not have to be created and managed in the coherency directory 154. Adding the memory address to the Bloom filter 156 is accomplished by setting the bits in the hash tables that correspond to the results of processing the memory address using the hash functions in the Bloom filter 156. The requestor of the memory address is given an exclusive state (with silent upgrade permission) as a response to the request. The requestor therefore does not have to access the coherency directory controller 150 for the same cache line and sends an eviction message to the coherency directory controller 150 when the cache line is evicted from the cache. Note that a subsequent request for the same memory address from a different cache would result in a miss in the coherence directory 154 and a hit in the Bloom filter 156, causing the memory address to be removed from the Bloom filter 156 and added to the coherence directory 154, as previously described in step 308.

The process depicted in FIG. 3 addresses the technical problem of how to control the increasing size of coherency directories in response to increases in the number and sizes of caches. The technical solution tracks memory addresses that are cached in only a single cache, i.e., private data, in a Bloom filter instead of a coherency directory to reduce the size of the coherence directory.

The invention claimed is:

1. A coherence directory controller comprising:
    one or more memories,
    a coherence directory,
    a Bloom filter stored in the one or more memories, and
    tracking logic configured to:
        in response to a query for a memory address, query both the coherence directory and the Bloom filter to determine whether the memory address is currently being tracked by the coherence directory or the Bloom filter,
        in response to the memory address not being tracked by either the coherence directory or the Bloom filter:
            initiate tracking of the memory address in the Bloom filter, and not tracking the memory address in the coherence directory, and
        in response to the memory address not being tracked by the coherence directory and being tracked by the Bloom filter:
            remove the memory address from the Bloom filter, and initiate tracking of the memory address in the coherence directory.

2. The coherence directory controller of claim 1, wherein the tracking logic is further configured to initiate tracking of the memory address in the Bloom filter by setting one or more bits in the Bloom filter that correspond to the memory address.

3. The coherence directory controller of claim 2, wherein:
    the Bloom filter comprises a plurality of hash tables, and
    the one or more bits are in the plurality of hash tables and correspond to a plurality of hash results generated when the memory address is processed by a plurality of hash functions used by the Bloom filter.

4. The coherence directory controller of claim 1, wherein:
    the Bloom filter comprises a plurality of hash tables and uses a plurality of hash functions, and
    the plurality of hash tables includes a hash table for each hash function, from the plurality of hash functions, and each cache from a plurality of caches being tracked by the Bloom filter.

5. The coherence directory controller of claim 1, wherein removing the memory address from the Bloom filter is performed after one or more of a specified amount of time, a specified number of clock cycles, or a specified number of accesses.

6. The coherence directory controller of claim 1, wherein removing the memory address from the Bloom filter includes resetting one or more bits in the Bloom filter that correspond to the memory address.

7. The coherence directory controller of claim 6, wherein removing the memory address from the Bloom filter includes:
    rehashing a plurality of addresses being tracked by the Bloom filter using a plurality of hash functions to determine a result set of bits, and
    resetting bits in the Bloom filter other than bits in the result set of bits.

8. The coherence directory controller of claim 7, wherein:
    the Bloom filter comprises a plurality of hash tables, and
    resetting a plurality of bits in the Bloom filter other than the result set of bits includes resetting all of the bits in the plurality of hash tables other than the bits in the result set of bits.

9. The coherence directory controller of claim 1, wherein the tracking logic is further configured to:
    in response to a second query for the memory address, query both the coherence directory and the Bloom filter to determine whether the memory address is currently being tracked by the coherence directory or the Bloom filter, in response to the memory address being tracked by the Bloom filter and not by the coherence directory:
remove the memory address from the Bloom filter, and initiate tracking of the memory address in the coherence directory.

10. The coherence directory controller of claim 1, wherein the tracking logic is further configured to, in response to the memory address being tracked by the coherence directory: continue tracking the memory address in the coherence directory, and not tracking the memory address in the Bloom filter.

11. The coherence directory controller of claim 1, wherein the tracking logic is further configured to determine whether the memory address is currently being tracked by the Bloom filter by:
processing the memory address by a plurality of hash functions in the Bloom filter to generate a result set of bits, and
determining whether the result set of bits are set in the Bloom filter.

12. A method comprising:
in response to a query for a memory address, querying both a coherence directory and a Bloom filter to determine whether the memory address is currently being tracked by the coherence directory or the Bloom filter, and
in response to the memory address not being tracked by either the coherence directory or the Bloom filter:
initiating tracking of the memory address in the Bloom filter, and
not tracking the memory address in the coherence directory, and
in response to the memory address not being tracked by the coherence directory and being tracked by the Bloom filter:
removing the memory address from the Bloom filter, and initiating tracking of the memory address in the coherence directory.

13. The method of claim 12, further comprising initiating tracking of the memory address in the Bloom filter by setting one or more bits in the Bloom filter that correspond to the memory address.

14. The method of claim 13, wherein:
the Bloom filter comprises a plurality of hash tables, and
the one or more bits are in the plurality of hash tables and correspond to a plurality of hash results generated when the memory address is processed by a plurality of hash functions used by the Bloom filter.

15. The method of claim 12, wherein:
the Bloom filter comprises a plurality of hash tables and uses a plurality of hash functions, and
the plurality of hash tables includes a hash table for each hash function, from the plurality of hash functions, and each cache from a plurality of caches being tracked by the Bloom filter.

16. The method of claim 12, wherein removing the memory address from the Bloom filter is performed after one or more of a specified amount of time, a specified number of clock cycles, or a specified number of accesses.

17. The method of claim 12, wherein removing the memory address from the Bloom filter includes resetting one or more bits in the Bloom filter that correspond to the memory address.

18. The method of claim 17, wherein removing the memory address from the Bloom filter includes:
rehashing a plurality of addresses being tracked by the Bloom filter using a plurality of hash functions to determine a result set of bits, and
resetting bits in the Bloom filter other than bits in the result set of bits.

\* \* \* \* \*